United States Patent [19]
Peters et al.

[11] 4,065,992
[45] Jan. 3, 1978

[54] SINGLE CUT SHEAR

[75] Inventors: James W. Peters, Cannelton, Ind.;
Charles Hardesty, Hardinsburg, Ky.

[73] Assignee: Southwire Company, Carrollton, Ga.

[21] Appl. No.: 758,924

[22] Filed: Jan. 13, 1977

[51] Int. Cl.² .......................................... B23D 25/12
[52] U.S. Cl. ...................................... 83/285; 83/299;
83/305; 83/306; 83/338
[58] Field of Search ............... 83/285, 299, 305, 306,
83/310, 338, 337

[56] References Cited
U.S. PATENT DOCUMENTS

| | | | |
|---|---|---|---|
| 2,401,639 | 6/1946 | Hawthorne | 83/338 |
| 2,621,740 | 12/1952 | Shanley | 83/285 |
| 3,057,239 | 10/1962 | Teplitz | 83/285 X |
| 3,561,311 | 2/1971 | Nowak | 83/338 |

*Primary Examiner*—J. M. Meister
*Attorney, Agent, or Firm*—Van C. Wilks; Herbert M. Hanegan; Stanley L. Tate

[57] ABSTRACT

An improved rotary shearing apparatus for cutting a rapidly moving body including rotatable blades which may be inserted into a cutting position and withdrawn therefrom, positioning means for inserting or withdrawing the blades into or out of cutting position, and automatic switches and circuitry capable of causing insertion of the blades and their withdrawal within one rotation of the blades, so that the blades will sever the rapidly moving body with a single clean cut and without disturbing its rapid movement.

10 Claims, 8 Drawing Figures

SINGLE CUT SHEAR

BACKGROUND OF THE INVENTION

This invention relates in general to the field of continuous casting and forming of metal rods and more particularly, to an apparatus and method for cutting such rods while they are moving at high speeds between apparatus such as a rolling mill and apparatus such as a coiler. Cutting a rapidly moving rod of metal has been difficult to achieve in the prior art because if the shear blades interrupt the continuous passage of the rod, or if they otherwise retard the speed of the portion of the rod moving toward the blades, the rod will buckle and form a cobble or will be deflected from its proper linear path.

One approach to nondisruptive cutting of rapidly moving metal rod involves the use of a rotary shear. Under this approach, a pair of guide wheels each having a groove around the peripheral surface thereof are mounted on parallel shafts and interconnected by gear means so that their rotation is synchronous but in opposite directions. The wheels and shafts are mounted so that the grooves in the peripheral surfaces are adjacent and form a passageway through which the rapidly moving rod is passed. A pair of blades, one rotatable with each wheel, are selectively inserted through the wheels into the passageway formed between the wheels in order to fill the entire passageway and thereby sever the rod.

In the prior art, the blades have been slid into and out of cutting position in the peripheral grooves of the guide wheels by mechanically connecting them to the piston rod of a pneumatic cylinder. The pneumatic cylinder is controlled by a pair of solenoid valves, each of which direct compressed air to one of the ends of the cylinder, thereby causing the piston to move either in or out.

This prior art rotary shear has proved adequate for waste or "cobble" cutting of rod since such cutting involves repetitive cutting of the rod to remove the waste or cobble and since it is normally not critical that cobble cutting start or stop at a given moment or at a given point on the rod. It has also proved adequate for cutting relatively slowly moving rod with a single cut to obtain rod of a particular length. However, serious problems arise when a prior art rotary shear is used to make a single cut of a rod moving at those linear speeds typically achieved by high production continuous casting and rolling apparatus.

For example, in a high production continuous casting and rolling apparatus for rod, the rod moves from a rolling mill or other hot forming apparatus at linear speeds of between 2600–3000 feet per minute and it has been a practical impossibility in the prior art to insert and withdraw cutting blades with solenoid valves and a pneumatic cylinder within the time required for one revolution of the guide wheels unless the guide wheels are of such diameter as to be impractical. This is because at such a speed, one revolution of guide wheels of such diameter as to be practical requires approximately 50 milliseconds, whereas the fastest available solenoid valves and pneumatic cylinders have a combined response time of about 50 to 60 milliseconds.

If the cutting blades are not withdrawn from cutting position within the passageway formed by the guide wheels within one revolution of the guide wheels following the first cut of the rod by the cutting blades, the rod will be cut a second time, nicked by a partially withdrawn blade, or otherwise damaged and made unsuitable for drawing into wire. Moreover, multiple cuts result in waste portions of rod which must be removed before they foul a component of the continuous casting and rolling apparatus, such as a coiler, downstream of the shear.

A further problem with prior art rotary shear is that if the cutting process is begun by a manual pushbutton, the pushbutton might commonly be held in for as long as ½ second, a period of time long enough to start the cutting process a second time considering the short period of time in which insertion of the blades, cutting, and withdrawal of the blades must be accomplished. Moreover, another problem with prior art rotary shears if a manual pushbutton is used is that it is clearly impossible to use a manual pushbutton to signal the insertion of the blades, wait until the rod is cut, and then signal the withdrawal of the blades and still accomplish withdrawal of the blades before the blades make another revolution with the guide wheels and a second cut of the rod.

Attempts have been made in the prior art to solve the problem described above by beginning withdrawal of the blades before the rod is cut with an automatic timing device responsive to the position of the blades. The aim of this approach is to cut the rod while the withdrawal solenoid valve is building up enough magnetic field to positively open the valve and move the piston of the pneumatic cylinder. However, automatic timing devices have also encountered problems because the response time of the solenoid valves alone is significant compared to the period of revolution of guide wheels of a practical size used with rod moving at typical speeds.

This is because such an automatic timing system must not cancel the signal to the "blade-in" solenoid and start a signal to the "blade-out" solenoid before the "blade-in" solenoid has built up enough magnetic field to positively open the valve and thereby move the cylinder piston and insert the blades. If the timing system starts withdrawal too early, no cut will be made. On the other hand, if such withdrawal is begun too late, either a second cut will be made in the rod or the rod may be nicked and made unsuitable for drawing into fine wire.

Attempts have been made to solve this problem of timing encountered by automatic timing devices by connecting the solenoid valves to two vane switches which are triggered by vanes rotating with the guide wheels. However, over a range of high speeds, this apparatus has proved unable to consistently initiate withdrawal of the cutting blades within the required critical interval of time.

SUMMARY OF THE INVENTION

Generally described, the present invention is an improvement in a rotary shear apparatus for cutting rapidly moving elongate material passing through a passageway formed between two rotating guide wheels by selectively positioning a cutting means for cutting said material in said passageway. The invention includes a positioning means for inserting the cutting means into a cutting position in the passageway while a first switching means is operative and for withdrawing the cutting means from said cutting position within the passageway while a second switching means is operative.

It also includes a control means having an operating means and a conditioning means. The operating means causes the first switching means to become operative at one of a plurality of rotational positions of the guide wheels and selectively causes the second switching means to become operative at a particular rotational position of the guide wheels. The conditioning means is responsive to the first switching means being operative during a first predetermined rotation of the guide wheels and conditions the second switching means to become operative in response to the operating means at the particular rotational position of the guide wheels. The particular rotational position of the guide wheels at which the second switching means becomes operative when conditioned to become operative by the conditioning means is selected so that operation of the second switching means occurs within a second predetermined rotation of the guide wheels which follows the response of the conditioning means to the first switching means being operative for the first predetermined rotation of the guide wheels.

It is therefore an object of the present invention to provide an improved apparatus for making a single cut in a rapidly moving body.

It is another object of the present invention to provide an improved apparatus capable of making a single cut in a rapidly moving body without disturbing the travel of said body and without nicking said body either prior to or following the single complete cut.

Other objects, features and advantages of the present invention will become apparent upon reading the following specification when taken in conjunction with the accompanying drawings, in which:

ILLUSTRATIVE EMBODIMENT

Figure 1:
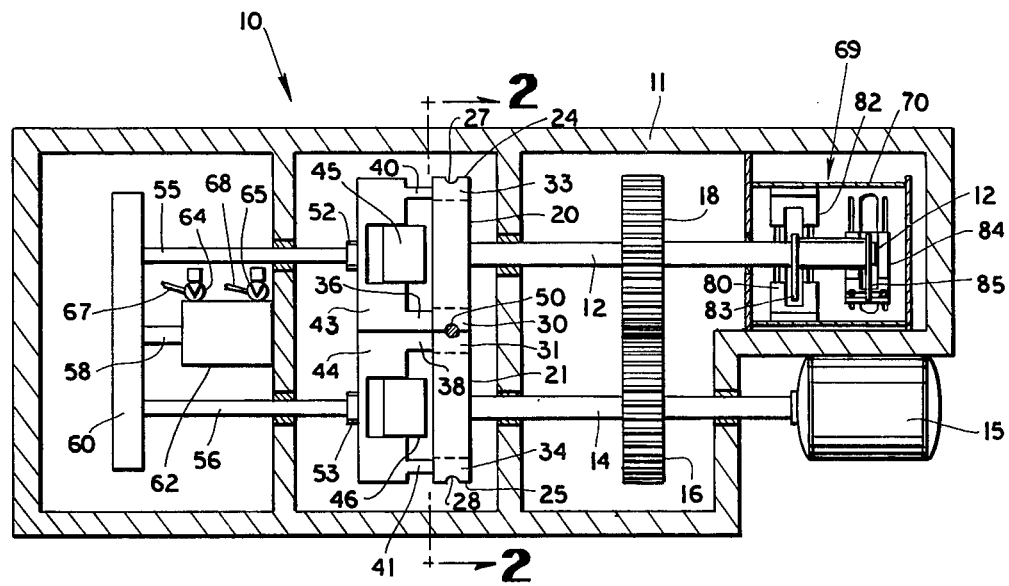
FIG. 1 is a front elevation view of a shear apparatus which embodies the invention with the main housing and the cylindrical housing within the main housing shown in cross-section.

Referring more specifically to the drawing, FIG. 1 shows a shear apparatus 10 embodying the present invention. A pair of parallel shaft members 12 and 14 are rotatably mounted in a housing 11. A motor means 15 is connected to and drives shaft member 14. Identical gear means 16 and 18 connected to shaft members 14 and 12, respectively, are drivingly engaged and confine shaft member 12 to rotation synchronous and opposite to the rotation of shaft member 14. A pair of guide wheels 20 and 21 each having a peripheral surface 24 and 25, respectively, and a groove therein 27 and 28, respectively, extending completely around the periphery of the respective guide wheel, are mounted on shaft members 12 and 14, respectively, and are affixed thereto by pins 22 and 23 shown in FIG. 2.

Figure 2:
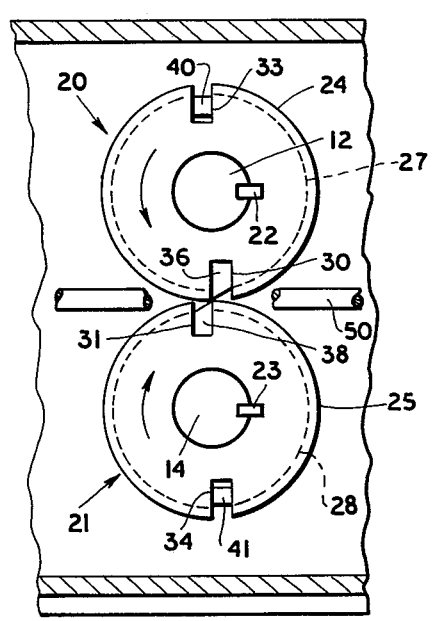
FIG. 2 is a cross-sectional view which is taken in 2—2 of FIG. 1 and which shows fragmentary portions of a rod passing between the guide wheels.

The depth of the peripheral grooves 27 and 28 is shown in FIG. 2 by dotted lines concentric with the peripheral surfaces. As shown in FIG. 2, each guide wheel contains a blade slot 30, 31 and a counterweight slot 33, 34, all of said slots extending through the width of the respective guide wheel and at the edge thereof. Blade slots 30 and 31 are placed approximately 180° around the guide wheels from the placement of the counterweight slots 33 and 34.

Rotatable with each guide wheel 20 and 21 and shaft members 21 and 14, respectively, is a cutting means 43 and 44 which is slideably mounted upon shaft extensions 45 and 46 fixed to shaft members 12 and 14, respectively. The cutting means 43 and 44 each include a pair of projections extending toward the guide wheels which provide blades 36 and 38 and counterweights 40 and 41. The cutting means 43 and 44 are oriented so that they may be selectively slid toward the guide wheels 20 and 21 in which case the blades 36 and 38 will enter blade slots 30 and 31, respectively and counterweights 40 and 41 will enter counterweight slots 33 and 34, respectively.

As shown in FIG. 1, the guide wheels 20 and 21 are mounted such that their peripheral surfaces 24 and 25 are adjacent so that the peripheral grooves 27 and 28 form a passageway between the guide wheels 20 and 21 wherein a metal rod 50 may pass moving at high speeds. The guide wheels 20 and 21 are fixed in a rotational relation such that the blade slots 30 and 31 are adjacent one another during one moment of each revolution of the guide wheels. It will be understood that, if the cutting means 43 and 44 have been slid toward the guide wheels 20 and 21 so that the blades 36 and 38 fill the peripheral grooves 27 and 28 at the location of the blade slots 30 and 31, at the moment when the blade slots are adjacent each other, the blades 36 and 38 must sever the rod 50 because both the blades and the rod cannot occupy the peripheral groove at the same time.

Counterweights 40 and 41 are thinner than the blades 36 and 38 by the depth of the peripheral grooves 27 and 28, so that when inserted into the guide wheels, counterweights 40 and 41 do not fill the peripheral grooves 27 and 28. The positioning means for insertion and withdrawal of the cutting means 43 and 44 comprises a pneumatic cylinder 62, the piston rod 58 of said cylinder being connected to insertion shafts 55 and 56 by connecting member 60. The insertion shafts 55 and 56 do not rotate, but are connected to cutting means 43 and 44 by bearing connectors 52 and 53, respectively, which allow the cutting means 43 and 44 to be slid upon shaft extensions 45 and 46 while at the same time rotating therewith.

A signal of sufficient duration directed to solenoid valve 64 will cause it to open and permit compressed air from a compressor (not shown) to enter the pneumatic cylinder 62 through tube 67 so as to force the piston (not shown) and the connected cutting means 43 and 44 in the direction of the guide wheels 20 and 21. A second solenoid valve 65 responds to a signal of sufficient duration to allow compressed air to flow into the pneumatic cylinder through tube 68 so as to drive the piston and the connected cutting means 43 and 44 away from the guide wheels 20 and 21 and therefore slide the blades 36 and 38 out of cutting position.

Figure 3:
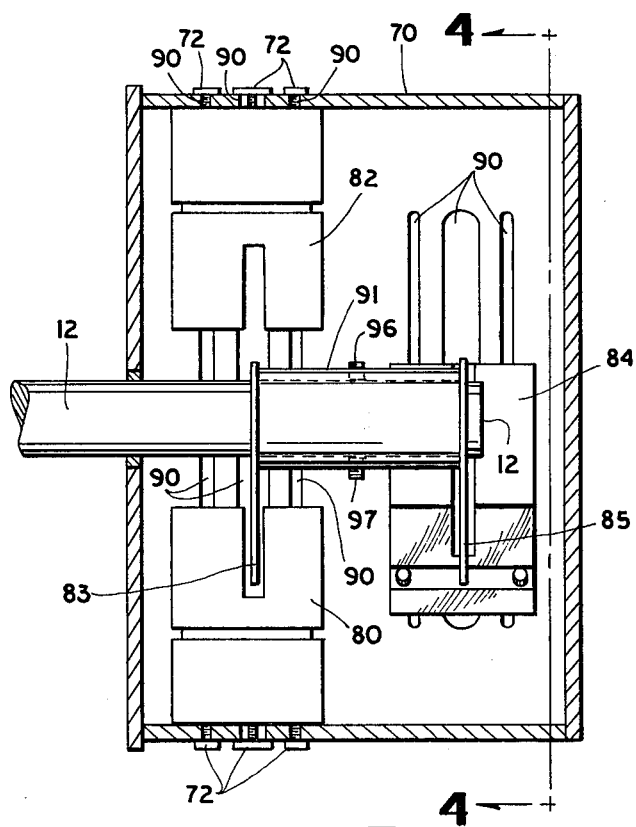
FIG. 3 is an enlarged view of the control means provided by the vanes and vane switches shown within the cylindrical housing 70 of FIG. 1.

A controlling means 69 for sending appropriate signals to the solenoid valves 64 and 65 is contained within a cylindrical housing 70 mounted about shaft member 12. As best seen in FIG. 3, a first, second and third switching means 80, 82 and 84 are adjustably mounted on the inner surface of the cylinder 70 by bolts 72 passing through adjusting slots 90 which extend around a portion of the circumference of the cylinder housing 70. The switching means 80, 82 and 84 are conventional magnetically actuated vane switches.

Figure 4:
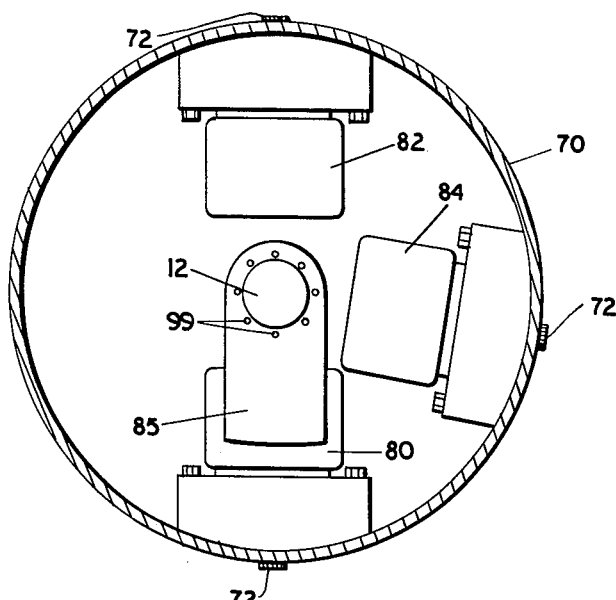
FIG. 4 is an end cross-sectional view of the cylindrical housing shown in FIG. 3 taken in 4—4 of FIG. 3.

A sleeve member 91 is fitted over the end of shaft member 12 and is rotatably adjustable about shaft member 12 by loosening and tightening set screws 96 and 97. Vanes 83 and 85 serve as an operating means for breaking the magnetic field of vane switches 80, 82 and 84 and as shown in FIG. 4, the vanes 83 and 85 are connected to the ends of the sleeve member 91 by screws 99 extending into sleeve member 91. Thus, each vane 81, 83 or 85 may be adjusted to one of a plurality of rotational positions with respect to sleeve member 91.

Appropriate wiring (not shown) and circuitry as will hereinafter be described, connects vane switch 80 with solenoid valve 64 and vane switch 82; connects vane switch 82 with vane switch 84; and connects vane switch 84 with solenoid valve 65. As will hereinafter be fully described, vane switch 82 provides a conditioning means responsive to vane switch 80 being operative for a predetermined rotation of the guide wheels for enabling vane switch 84 to become operative in response to being triggered by vane 83.

Figure 5:
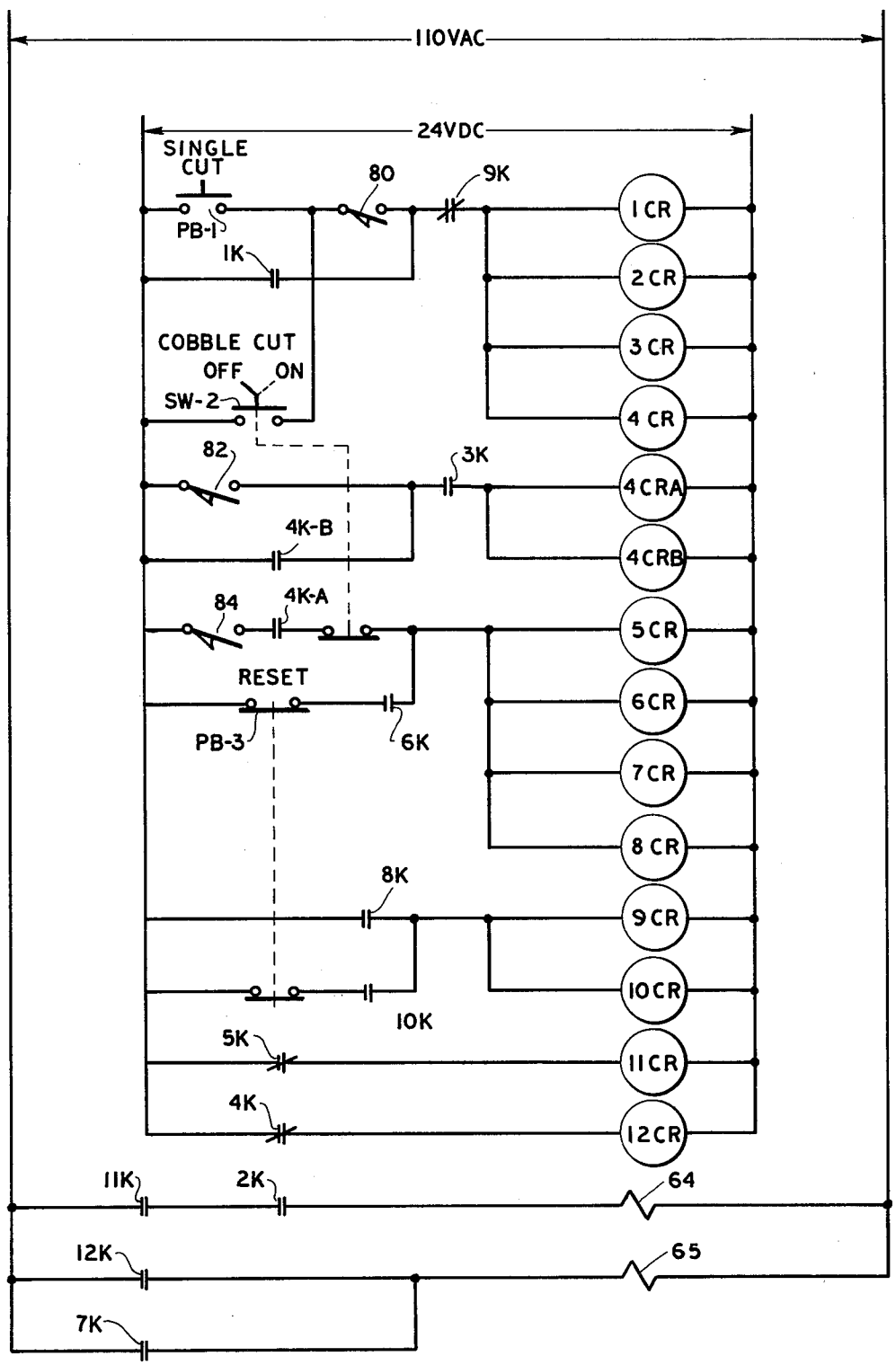
FIG. 5 is a schematic representation of the circuitry interconnecting the vane switches and the switching means for insertion and withdrawal of the cutting means in the embodiment of the invention shown in FIG. 1.

FIG. 5 is a schematic diagram of the electrical circuitry which forms a part of the controlling means 69 and, in conjunction with the three switching means 80, 82 and 84 and the three operating means 83 and 85 provides the means for timing the insertion and withdrawal of the cutting means 43 and 44 by the pneumatic cylinder 62 so as to cause the blades 36 and 38 to be inserted into the guide wheels 20 and 21 and subsequently withdrawn before the rod 50 is severed or engaged a second time. From FIG. 5, it will be seen that a potential difference of 110 volts AC is maintained across the circuit containing solenoid valves 64 and 65, and that a potential difference of 24 volts DC is maintained across the circuit containing the vane switches 80, 82, and 84.

A manual pushbutton PB-1 is provided to allow an operator to begin the single cut cycle by operating the pushbutton PB-1. After PB-1 has been pressed, the first time that vane 83, rotating with shaft member 12, passes through vane switch 80, current will pass through relay coils 1CR, 2CR, 3CR, and 4CR, and normally open relay contact 1K will close in response to 1CR to thereby maintain power through coils 1CR, 2CR, 3CR, and 4CR after vane 83 has passed out of and opened vane switch 80. Relay coil 2CR has now closed normally open contact 2K. Since relay contact 5K is normally closed, thereby normally allowing power to pass through relay coil 11CR, relay contact 11K is closed and the closing of contact 2K has therefore sent a singal to solenoid valve 64 which begins to build up magnetic field until it opens and causes pneumatic cylinder 62 to insert blades 36 and 38.

Relay coil 4CR opens normally closed relay contact 4K which thereby cuts off power through relay coil 12CR and thereby opens relay contact 12K. Since at this time relay contact 7K is open, it will be seen that the triggering of vane switch 80 has cut off the electrical signal to solenoid valve 65 at the same time it has resulted in a signal being directed to solenoid valve 64.

Relay coil 3CR closes normally open relay contact 3K so that when vane 83 next passes through vane switch 82 relay coils 4CRA and 4CRB are energized. Relay coil 4CRB closes normally open relay contact 4K-B which maintains power through coils 4CRA and 4CRB after vane 83 has passed out of and opened vane switch 82. Relay coil 4CRA, energized as vane 83 passes through vane switch 82, closes normally open relay contact 4K-A so that when vane 85 next passes through vane switch 84 relay coils 5CR, 6CR, 7CR and 8CR are energized. Normally open relay contact 6K closes in response to 6CR to maintain power to these last stated relay coils after vane 85 has passed out of vane switch 84.

Relay coil 5CR opens normally closed relay contact 5K cutting off power from relay coil 11CR, thereby opening relay contact 11K and cancelling the electrical signal being sent to solenoid valve 64. Relay coil 7CR closes normally open relay contact 7K which, since it is in parallel with the now open relay contact 12K, results in the transmission of an electrical signal to solenoid valve 65.

Solenoid valve 65 now begins to build up a magnetic field until it opens and causes the pneumatic cylinder 62 to withdraw blades 36 and 38 out of the blade slots 30 and 31 in the guide wheels 20 and 21. Relay coil 8CR closes normally open relay contact 8K resulting in the energization of relay coils 9CR and 10CR, and normally open relay contact 10K closes in response relay coil 10CR to maintain current to relay coils 9CR and 10CR.

Relay coil 9CR opens normally closed relay contact 9K thereby deenergizing relay coils 1CR, 2CR, 3CR and 4CR to cause relay contacts 2K and 3K to open and normally closed relay contact 4K to close. This results in the cancelling of the electrical signal to insertion solenoid valve 64 at the same time as relay contact 7K has closed to send a signal to the withdrawal solenoid valve 65.

The circuits containing vane switches 80 and 82 are now broken rendering signals from vane switches 80 and 82 inoperative. However, relay coils 5CR, 6CR, 7CR and 8CR remain energized until the reset pushbutton PB-3 is manually pressed, simultaneously deenergizing relay coils 5CR, 6CR, 7CR, 8CR, 9CR, and 10CR.

The depression of PB-3 causes relay contact 5K to close and therefore relay contact 11K to close. It also causes relay contact 7K to open leaving relay contact 12K closed until the next cycle is begun. It further causes relay contact 9K to return to its normally closed position, so that when pushbutton PB-1 is again depressed, vane switch 80 will be enabled to energize relay coils 1CR, 2CR, 3CR and 4CR the next time vane 83 passes through vane switch 80.

It will therefore be understood that by the adjustment of the positions of the vanes 83 and 85 about the shaft member 12 and of the vane switches 80, 82 and 84 along the slots 90 in the cylinder 70 relative to the positions of blades 36 and 38 about the shaft members 12 and 14, the triggering of vane switch 82 by vane 83 may be controlled so as to delay the possibility of the triggering of vane switch 84 by vane 85. This is because the vane switch 82 serves as a conditioning means which must be triggered before vane switch 84 can be operative.

The delay is predetermined so that the signal to insertion solenoid valve 64 from vane switch 80 will not be cut off by a signal from vane switch 84 before a sufficient magnetic field has been built up to open the valve. On the other hand, the delay is also predetermined so that it is short enough to assure that vane switch 84 will be triggered by vane 85 soon enough for the cutting means 43 and 44 to be withdrawn by the pneumatic cylinder 62 before the blades 36 and 38 are able to make a second cut of the rod.

It will be understood from the foregoing that the delay between the triggering of vane switch 80 and the subsequent triggering of vane switch 82 by a vane 83 corresponds to a first predetermined rotation of the guide wheels. Similarly, the time period between the triggering of the vane switch 82 to condition the vane switch 84 to operate and the triggering of vane switch 84 corresponds to a second predetermined rotation of the guide wheels.

It will also be understood that both of said predetermined rotations are determined by the fixed relative rotational positions of the vanes and vane switches. However, since the triggering of vane switch 84 must not occur until after the response time of the first solenoid valve 64, the sum of the combined first and second predetermined rotations must be at least equal to the time required for magnetic field build-up of first solenoid valve 64.

Further, since the blades 36 and 38 must be withdrawn within one revolution of the guide wheels after the first cut of the rod, the maximum time available for insertion and withdrawal of the blades 36 and 38 must be less than the total of the time required for the solenoid and pneumatic cylinder to insert the blades 36 and 38, the time required for the blades 36 and 38 to initially rotate to cutting position after insertion, and the time required for one revolution of the guide wheels. However, this maximum available time also equals the sum of the first and second predetermined rotations plus the solenoid and pneumatic cylinder response time for withdrawal of the blade means. Therefore the maximum combined first and second predetermined rotations must be equal to the time required for the blades 36 and 38 to initially rotate to the cutting position after insertion (a maximum of one revolution) plus the time required for one revolution of the guide wheels, or a possible maximum total of two revolutions of the guide wheels.

If it is desired to cut the rod continuously for removal of cobble or other waste material, a cobble cut selector switch SW-2 (FIG. 5) may be switched. When SW-2 is switched relay coils 1CR, 2CR, 3CR and 4CR are energized and the power thereto maintained by the closing of relay contact 1K. This results in a continuous signal being sent to the insertion solenoid valve 64 as hereinabove described. The switching of SW-2 also breaks the circuit containing vane switch 84 and thereby eliminates the possibility of any signal being emitted by vane switch 84 which might result in the withdrawal of the blades 36 and 38. The blades will continue to cut the rod until the cobble cut switch SW-2 is switched off enabling vane switch 84 to perform its normal task of incapacitating the insertion solenoid 64 and activating the withdrawal solenoid valve 65.

OPERATION

Figure 6:
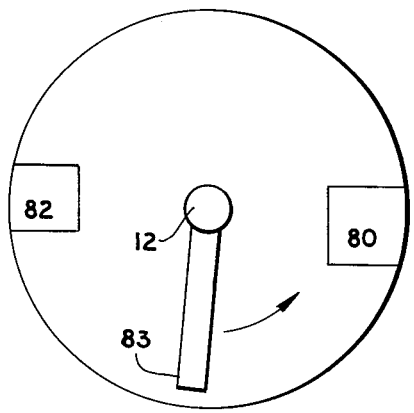
FIG. 6 is a schematic representation of an initial orientation of two of the vane switches and their respective vanes.
Figure 7:
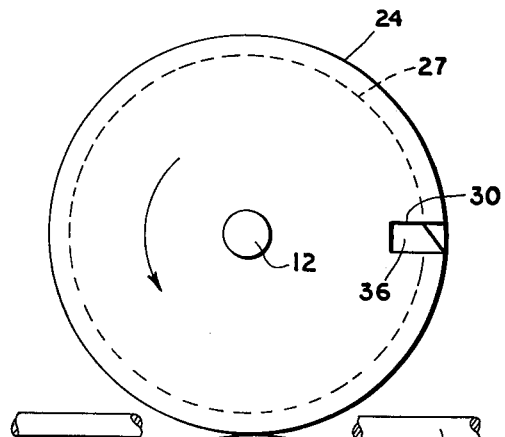
FIG. 7 is a schematic representation of an initial orientation of the third vane switch and its vane, corresopnding to the orientation of the two vane switches and their respective vanes shown in FIG. 6.
Figure 7:
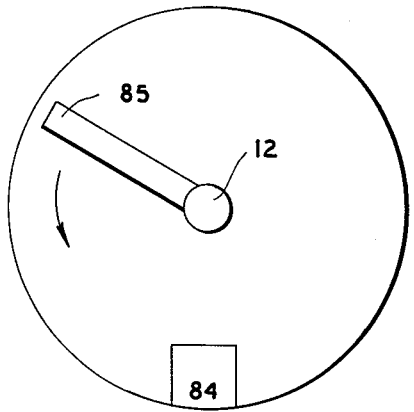
Figure 8:
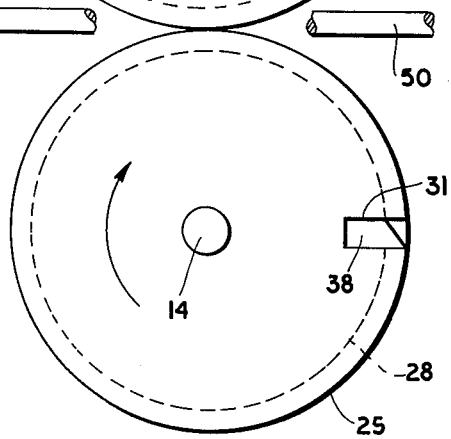
FIG. 8 is a schematic representation of an initial orientation of the guide wheels and cutting blades corresponding to the orientation of vane switches and their respective vanes shown in FIGS. 6 and 7, showing fragmentary portions of a rod passing between the guide wheels.

For the purpose of explaining the operation of the present invention, it will be assumed that the vane switches, vanes and guide wheels are relatively positioned according to the diagrammatic representations of FIGS. 6, 7 and 8 in order to accomplish a signal cut of a metal rod according to the present invention. In this embodiment, vane 83 comprises a single strip of metal attached to one end of the sleeve member 91. Since vane switches 80 and 82 are positioned in the same plane as shown in FIG. 3, it will be understood that each of vane switches 80 and 82 may be triggered by vane 83. Vane 85 is connected to the opposite end of the sleeve member. However, if the cylinder 70 is considered as being viewed from the same end thereof, in FIGS. 6 and 7, when vane 83 extends toward the "6 o'clock" position, vane 85 will point toward "10 o'clock". The vanes are adjusted to such positions when the guide wheels 20 and 21 are oriented so that the blade slots 30 and 31 both point toward the "3 o'clock" position of their respective guide wheels, as shown in FIG. 8. The motor 15 drives shaft member 14 and guide wheel 21 in a clockwise direction, and therefore gear means 16 and 18 cause shaft member 12, sleeve member 91, vanes 83 and 85, and guide wheel 20 to rotate in a counterclockwise direction as seen in FIGS. 6, 7, and 8.

For purposes of explanation, it will also be assumed that the vane switches utilized in this embodiment typically have a response time of approximately 1 millisecond which for the sake of clarity, will be ignored in the following description of the operation of the present invention. Conventional solenoid valves 64 and 65 have a response time during which a magnetic field must build within the coil of the valve, said response time varying according to the point on the AC cycle at which the signal to the solenoid valve is begun. It will be assumed that for the solenoid valves utilized in the present embodiment, this response time may vary from a minimum of 24 milliseconds to a maximum of 32 milliseconds.

The response time of the pneumatic cylinder 62 comprising the time required for the piston to be moved from one end of the cylinder to the other, will be assumed to vary from 22 to 26 milliseconds. It will also be assumed in the following description that the rapidly moving metal rod has a linear speed of 2,800 feet per minute, and that the peripheral surfaces 24 and 25 of the guide wheels 20 and 21 have a linear speed of 3,500 feet per minute.

Further, it will be assumed that this linear speed of the peripheral surfaces 24 and 25 of the guide wheels 20 and 21 corresponds to an elasped time of 48 milliseconds per revolution of the guide wheels. Thus, it may be noted that the period occupied by one revolution of the guide wheels is less than the maximum time elapsed between the initiation of the signal to a solenoid valve and the completion of insertion or withdrawal of the cutting means 43 and 44 by the pneumatic cylinder 62 which is 58 milliseconds.

If it is assumed that the single-cut start pushbutton PB-1 is depressed when the vanes are in the initial positions previously described, that is when vane 83 is at "6 o'clock" and vane 85 is at "10 o'clock", after 12 milliseconds elapse vane 83 passes through vane switch 80 and the circuitry as previously explained causes the eventual insertion of blades 36 and 38 in the blade slots 30 and 31 of the guide wheels 20 and 21. After another 4 milliseconds elapses, vane 85 passes through vane switch 84 but there is no response because relay contact 4K-A has not yet been closed. If vane switch 84 was capable of responding at this time, it would immediately open relay contact 2K and thereby cut off the signal to solenoid valve 64 although another 20 to 28 milliseconds will be required for solenoid 64 to build up sufficient magnetic field to open the valve and operate pneumatic cylinder 62. In order to prevent this occurrence, which would prevent the insertion of blades 36 and 38, the possibility of a signal from vane switch 84 is made to depend upon the prior operation of vane switch 82, as described above in the discussion of FIG. 5.

Vane switch 82 is triggered by vane 83 36 milliseconds after the depression of PB-1. Therefore the next time vane 85 passes through vane switch 84, at the 64 millisecond point after depression of PB-1, vane switch 84 transmits the signal to solenoid valve 65 which begins the withdrawal of blades 36 and 38.

Considering the response time of solenoid valve 64 and pneumatic cylinder 62, the blades 36 and 38 will become completely inserted into cutting position within guide wheels 20 and 21 at a point between 58 and 70 milliseconds after the depression of PB-1. It will therefore be understood that the initiation of withdrawal of the blades may occur before the blades are completely inserted into cutting position. However, at 72 milliseconds after the depression of PB-1 the blades 36 and 38 have been completely inserted and are located at the "9 o'clock" position of their respective guide wheels 20 and 21. The rod 50 is cut 12 milliseconds later when blade 36 is at "6 o'clock" and blade 38 is at "12 o'clock".

The blades 36 and 38 must be completely withdrawn from the guide wheels before the blades make a second cut 48 milliseconds later, at the 132 millisecond point after the depression of PB-1. However, the maximum response time for solenoid valve 65 and pneumatic cylinder 62 following the activation of vane switch 84 will allow the accomplishment of complete withdrawal of the blades 36 and 38 by the 122 millisecond point since vane 85 activated vane switch 84 at the 64 millisecond point. At this time the circuitry as previously described maintains the blades in the withdrawn position until the reset pushbutton PB-3 is depressed and the single cut start pushbutton PB-1 is again depressed to start a cutting cycle.

It will be understood that given particular solenoid valves, a particular pneumatic cylinder and a particular rod speed, the relative rotational positions of the vanes, vane switches, and blade means may be fixed so that a single cut of the rod will be positively and safely made whatever the initial rotational position of the vanes when start pushbutton PB-1 is depressed. This is true because the amount of rotation after which vane switch 82 is triggered after the triggering of vane switch 80 and the amount of rotation at which vane switch 84 is triggered after the triggering of vane switch 82 are controlled by the relative orientation of the vanes, vane switches and blades 36 and 38 so as to delay the withdrawal signal from vane switch 84 until the inserting solenoid valve 64 has fully opened while assuring that vane switch 84 sends its signal to solenoid valve 65 soon enough to allow withdrawal of the blade means prior to a second cut of the rod.

While this invention has been described in detail with particular reference to preferred embodiments thereof, it will be understood that variations and modifications can be effected within the spirit and scope of the invention as hereinabove described and as defined in the appended claims.

What is claimed is:

1. In a rotary shear for cutting elongate material passing through a passageway formed between two guide wheels rotating in opposite directions by selectively positioning a cutting means rotating with said guide wheels for cutting said material in said passageway and having a positioning means for moving said cutting means into a cutting position in said passageway while a first switching means is operative and for moving said cutting means from said cutting position in said passageway while a second switching means is operative, including: operating means for causing said first switching means to become operative at a first particular rotational position of said guide wheels and for selectively causing said second switching means to become operative at a second particular rotational position of said guide wheels; and conditioning means responsive to said first switching means being operative for a first predetermined rotation of said guide wheels for rendering said second switching means operative in response to said operating means at said second particular rotational position of said guide wheels, said operation of said second switching means at said second particular rotational position occurring within a second predetermined rotation of said guide wheels following the response of the conditioning means to the first switching means being operative for a first predetermined rotation of said guide wheels, wherein said first and second switching means comprise magnetically actuated vane switches, said operating means comprises a pair of vanes extending from a shaft member rotating in synchronization with said guide wheels and positioned on said shaft member so that the first of said pair of vanes passes through said first switching means and the second of said pair of vanes passes through said second switching means, and said conditioning means comprises a third magnetically actuated vane switch through which passes the first of said pair of vanes.

2. A rotary shear as claimed in claim 1 wherein the positioning means comprises a pneumatic cylinder having a piston therein connected to said cutting means, a first solenoid valve for causing said pneumatic cylinder to move said cutting means into a cutting position in response to the operation of said first switching means, and a second solenoid valve for causing said pneumatic cylinder to move said cutting means out from said cutting position in response to the operation of said second switching means.

3. A rotary shear as claimed in claim 2 wherein the time occupied by the sum of said first predetermined rotation of said guide wheels and said second predetermined rotation of said guide wheels equals at least the response time of said first solenoid valve but no more than the total of the time required for one revolution of said guide wheels and the time required for the cutting means to move with said guide wheels to a rotational position where the elongate material will be cut after said cutting means have been insertd into a cutting position.

4. A rotary shear as claimed in claim 1 wherein said control means further comprises a start switching means for selectively enabling the operation of said first switching means.

5. A rotary shear as claimed in claim 1 further comprising means for selectively incapacitating said second switching means and for selectively prolonging the operation of said first switching means, whereby said cutting means will remain in a cutting position and make multiple cuts of said elongate material.

6. A rotary shear as claimed in claim 1 wherein
said first particular rotational position of said guide wheels is 180° in the direction of rotation of one of said guide wheels from the rotational position of said guide wheels in which said cutting means is adjacent said elongate material;
said second particular rotational position of said guide wheels is the position in which said cutting means is adjacent said elongate material;
said first predetermined rotation of said guide wheels in their respective directions of rotation is a rotation through 180°; and
said second predetermined rotation of said guide wheels in their respective directions of rotation is a rotation through 210°.

7. In a rod shear of the type comprising a pair of parallel rotatable shaft members, a motor means connected to one of said shaft members, gear means connecting said shaft members and confining them to synchronous opposite rotation, a pair of wheels each having grooved peripheral surface and a blade slot extending radially into said surface and through the wheel, one of said wheels connected to and rotatable with each of the shaft members, said wheels and shaft members mounted in a position wherein the grooves in the circumferential surfaces of the wheels are adjacent one another at a point forming a passageway between the adjacent wheels wherein may pass a metal rod, said wheels in a rotational relation with respect to one another wherein the blade slots will pass the point at which the wheels are adjacent at the same moment during each revolution of the wheels, a pair of blades, one of said blades mounted on and rotatable with each wheel and insertable into the blade slot of said wheel, positioning means for selectively inserting or retracting the blades from their respective blade slots in unison, and control means for producing a signal to cause the positioning means to insert and retract the blades, said positioning means having a response time from the receipt of the signal from the control means until the completion of insertion or retraction of the blades near or greater than the time passing during one revolution of the wheels, the improvement in said control means comprising:
a manual start switch;
a first vane rotating with the shaft member of said pair of shaft members which rotates in a counterclockwise direction and extending from said shaft member at a rotational position 270° counterclockwise from the position of the blade in the wheel which is mounted on said shaft member;
a second vane rotating with said shaft member and extending from said shaft member at a rotational position 150° counterclockwise from the position of said blade in said wheel;
a first magnetically actuated vane switch mounted in the path of said first vane at a rotational position 90° counterclockwise from the point where said passageway is formed;
a second magnetically actuated vane switch mounted in the path of said second vane at the rotational position where said passageway is formed;
a third magnetically actuated vane switch mounted in the path of said first vane at a rotational position 270° counterclockwise from the point where said passageway is formed;
a first circuit responsive to said start switch to enable said first vane switch to respond to triggering by the passage of said first vane;
a second circuit responsive to the triggering of said first vane switch to enable said third vane switch to respond to triggering by the passage of said first vane; and
a third circuit responsive to the triggering of said third vane switch to enable said second vane switch to respond to triggering by the passage of said second vane;
said first vane switch signalling the positioning means to insert said blades when triggered by said first vane and said second vane switch signalling the positioning means to withdraw said blades when triggered by said second vane.

8. A rotary shear as claimed in claim 7 wherein the positioning means comprises a pneumatic cylinder having a piston therein connected to said cutting means, a first solenoid valve for causing said pneumatic cylinder to move said cutting means into a cutting position in response to the operation of said first switching means, and a second solenoid valve for causing said pneumatic cylinder to move said cutting means out from said cutting position in response to the operation of said second switching means.

9. A rotary shear as claimed in claim 7 further comprising means for selectively incapacitating said second switching means and for selectively prolonging the operation of said first switching means, whereby said cutting means will remain in a cutting position and make multiple cuts of said elongate material.

10. A rotary shear as claimed in claim 9 wherein said incapacitating and prolonging means comprises a manual cobble switch and a fourth circuit activated by said cobble switch to prevent said third circuit from enabling said second vane switch to respond to triggering by said second vane.

* * * * *